United States Patent [19]

Shiota

[11] 4,448,521
[45] May 15, 1984

[54] COLOR FILM PRINTING CONTROL METHOD

[75] Inventor: Kazuo Shiota, Kanagawa, Japan

[73] Assignee: Fuji Photo Film Co., Ltd., Kanagawa, Japan

[21] Appl. No.: 360,537

[22] Filed: Mar. 22, 1982

[30] Foreign Application Priority Data

Mar. 23, 1981 [JP] Japan ................................. 56-42010

[51] Int. Cl.³ ............................................. G03B 27/32
[52] U.S. Cl. ........................................ 355/77; 355/38
[58] Field of Search .............................. 355/38, 88, 77

[56] References Cited

U.S. PATENT DOCUMENTS 4,168,120 9/1979 Frier et al. ........................... 355/38

Primary Examiner—Richard A. Wintercorn
Attorney, Agent, or Firm—Sughrue, Mion, Zinn, Macpeak, and Seas

[57] ABSTRACT

Disclosed is a method of controlling color film printing to improve the quality of prints obtained from degraded or deteriorated negatives. The method includes measuring the three color densities (R, G, and B) of the mask of the negative, e.g. a transparent film portion, and comparing these densities with the average densities of the mask of a normal negative, and varying the exposure conditions to compensate according to the degree of difference detected.

4 Claims, 2 Drawing Figures

COLOR FILM PRINTING CONTROL METHOD

BACKGROUND OF THE INVENTION

This invention relates to a picture printing control method employed in printing a picture with negative color film whose quality has changed due to a lapse of time or unsuitable storage.

When a sensitized material is stored for a considerably long period, or if it is stored in unsuitable circumstances, the sensitivity of at least one of the sensitized layers thereof will be decreased or increased, i.e., the characteristic curve thereof is changed. If a color negative film whose characteristic has been changed as described above is used to print a picture on color paper under the same exposure conditions as a normal negative, the resultant print is considerably non-uniform in chromatic balance.

Negative color films produced by amateur cameramen are often photographed under various light sources such as daylight or light from tungsten or fluorescent lamps and the object images in the films are biased variously in hue. Therefore, heretofore, in automatic exposure correction using a print making apparatus, the exposure is, in general, corrected as follows:

Correction of the deviation in chromatic balance due to the light source used is carried out according to Evans's principle (cf. U.S. Pat. No. 2,571,697). When an ordinary object is photographed, the percentages of the three color components, blue, green and red are substantially equal to one another as a whole, and therefore if the light passed through the negative is integrated and mixed with respect to the entire image, then a substantially constant chromatic balance can be obtained in correspondence to the light source used for photography. It is desirable for a print that the correction is made so that the percentages of the three color components are substantially equal over the entire image. Therefore, if the average transmission density of the entire negative image, i.e., a large area average density (LATD) is represented by $D_i$ (where i represents any one of the blue, green and red color components), the exposure time $T_i$ for each color may be obtained from the following expression:

$$\log T_i = \alpha_i D_i + \beta_i$$

where $\alpha$ and $\beta$ are constants.

Therefore, the exposure time is decreased when the large area average density $D_i$ of a color is small, while the exposure time is increased when the value $D_i$ is large, to correct the density and the chromatic balance.

Even when the same light source is used in taking pictures, sometimes the hue deviates greatly depending on the objects photographed. For instance in the case where a person in front of a green lawn or a red wall is photographed, the proportion of the three color components blue, green and red deviates greatly as a whole (this is known as "color failure"). In the case when color correction is applied to the negative object according to Evans's principle, the face of the person photographed with the green background appears rather magenta in the print, and the face of the person photographed with the red background appears rather cyan in the print; that is, the color of the resultant print does not agree with the color of the photographed object. If, in the case where such an object is photographed in daylight, the average value $\overline{D}$ of the values $D_i$ of the three colors is inserted for $D_i$ in the equation for calculating the exposure times $T_i$ described above, a print suitable in charomatic balance can be obtained without being affected by the deviation in hue of the object. Accordingly, if the correct chromatic balance can be obtained with the exposure times for an ordinary object in daylight being the same for all three colors, a print correct in chromatic balance can be obtained for an object photographed with a green or red background by making the exposure times for the three colors equal (the exposure times being increased or decreased, as a whole, according to the average density) irrespective of the object.

Roughly stated, there are two methods of correcting chromatic balance, as is apparent from the above description, which are called "high correction" and "lower correction", respectively. The "high correction" is effective in correcting the deviation in chromatic balance due to the light source used, and the "lower correction" is effective in correcting for color failure, as described above.

The "high correction" and the "lower correction" methods are in contradiction with each other. In practice, the negatives handled in a developing laboratory are of objects photographed under various light sources and include various color failures. Therefore, the degree of correction in the picture printing apparatus is, in general, set somewhere between "high correction" and "lower correction". The "high correction" or the "lower correction" is selected depending upon the content of the images in the negative color film (i.e., depending upon the light sources used in photography and the deviations in hue of the objects photographed), or correction keys ae suitably selected, so that the exposure times for three colors are changed independently in balance, thereby to correct the chromatic balance of negatives which cannot be corrected by the ordinary setting.

Negatives which cannot be corrected by the ordinary setting as described above include those have been changed in quality or characteristic because of a lapse of time, those which have been used in photographing objects in light from a tungsten or fluorescent lamp, and those which include serious color failures. In order to automatically discriminate such negatives, a method is employed in which the image in a color negative is subjected to three-color (red, green and blue) separation scanning, to detect local due information in the image, so that calculation may be effected according to the hue information thus detected.

However, in the case of a negative whose quality has changed because of a lapse of time or insufficient storage, it is difficult to sufficiently detect the degree of quality change by the method in which the image in the negative is subjected to three-color separation scanning to detect local hue information in the image, as described above, because the degree of quality change in the negative is not uniform, and mixes with the hue of the object itself.

SUMMARY OF THE INVENTION

Accordingly, an object of this invention is to provide a picture printing condition control method in which a negative color film whose quality has been changed because it has not been developed within the effective period or because it has been stored in unsatisfactory circumferences is detected, and in which exposure correction according to the characteristics of the quality change is carried out.

The foregoing object of the invention has been achieved by the provision of a picture printing control method in which, according to the invention, the densities of the three separate colors, namely, red (R), green (G) and blue (B) of the mask (transparent and not exposed) of a negative to be printed are measured, the densities thus measured being compared with the average densities of the three colors of the mask of a normal negative, the type of which is equivalent to that of the negative to be used for printing, to determine the degree of difference therebetween, and in which the exposure conditions are corrected according to the degree of the differences thus determined.

DETAILED DESCRIPTION OF THE PREFERRED EMBODIMENTS

Figure 1:
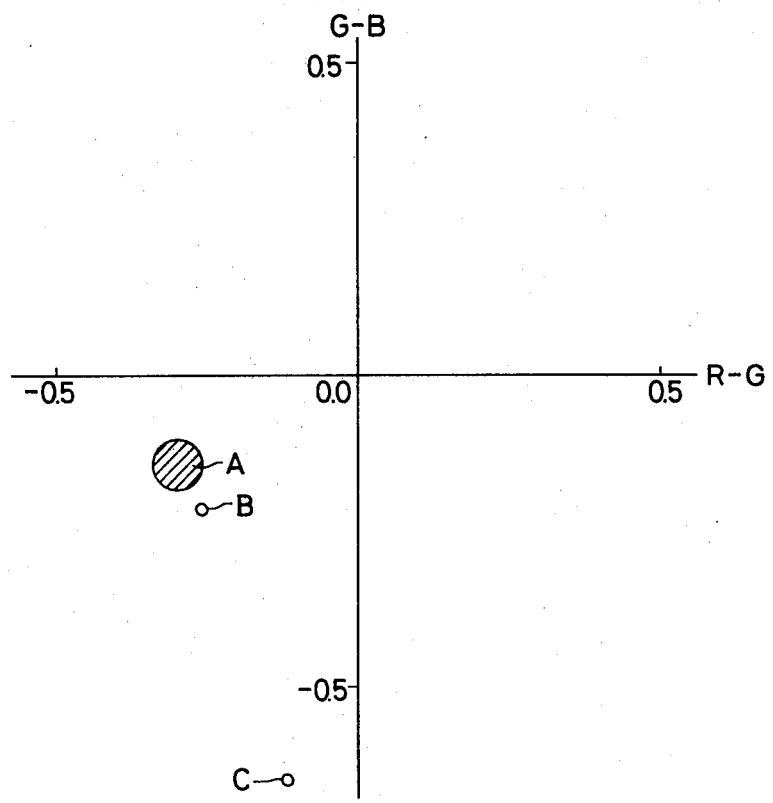
FIG. 1 is an X-Y coodinate system indicating the mask density hues of negative color films.

The mask density of a negative color film which has been stored correctly and developed within the effective period is substantially constant in density and chromatic balance, and the R, G, and B color density balance is concentrated, for instance, in a region A in the coordinate system shown in FIG. 1. However, in the case of a negative which has been developed after the effective period or has experienced extremely high temperatures or harmful gas before or after photography (hereinafter referred to as deteriorated film), the chromatic balance of the mask density goes out of the region A, and the hue may be as indicated at position B, or at worst at position C in FIG. 1.

If a deteriorated film in which the mask density is unsatisfactory in chromatic balance is subjected to printing under the same exposure conditions as a normal negative, the resultant print will be unsatisfactory in chromatic balance. Therefore, the printing conditions must be corrected. That is, it is necessary to carry out exposure, for instance, by increasing the degree of correction, or by changing the balance of exposure times for the three colors, so that the resultant print is satisfactory in chromatic balance.

The deteriorated film can be detected by the following method: The three color densities of a transparent region of a piece of negative color film are measured, to determine the difference between the measured values and the average hue values of the three color densities of the normal mask of a negative color film of the same kind which has been measured. In printing with the piece of negative color film, if the exposure is carried out with the corrected printing conditions, the resultant print is of sufficienty high quality. This is achieved by using, in combination, the correcting values for each piece of negative color film which are determined according to the degree of variation in mask density and the correcting values for each image frame which are determined according to the hue information which is obtained from each image frame.

Figure 2:
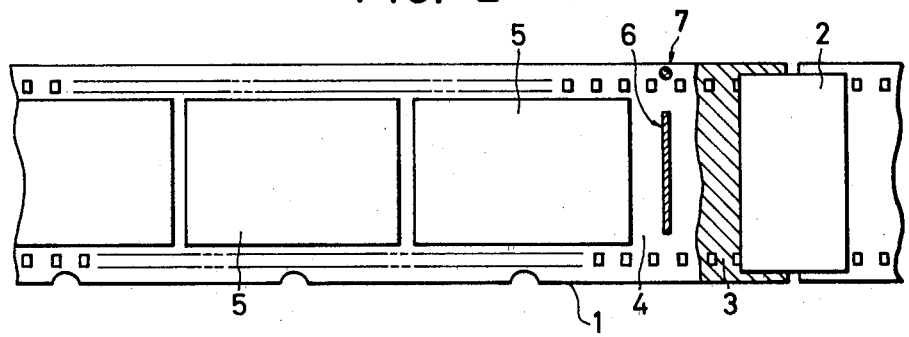
FIG. 2 is an explanatory diagram for a describing the density measurement of a negative.

Now, a method of detecting a deteriorated film, for determining the picture printing conditions, by scanning negatives, will be described with reference to the 135 mm film shown in FIG. 2. In FIG. 2, a negative film 1 runs toward the right through an image frame density scanning photometric unit 6 and a mask density photometric unit 7. First, a splice 2 passes the image frame density scanning photometric unit 6 before the negative color picture. Then, depending on the negative, a foggy region 3 passes through the photometric unit 6. After the foggy region 3, a transparent region 4 passes through the photometric unit 6, and thereafter the first image frame 5 reaches the photometric unit 6. Before the image frame 5 is scanned, the three color (R, G and B) densities of the transparent edge region (or the mask) of the film 1 are measured by the mask density photometric unit 7 and are stored. The minimum densities which are outputted by the mask density photometric unit 7 after the splice 2 has passed are stored in this case. The three densities of each image frame are then measured by the image frame scanning photometric unit 6 which carries out measurement by scanning the entire surface of an image frame successively, so that density characteristics such as the average density, the maximum density, the minimum density, the hues thereof and skin color hue are stored. The printing conditions are then calculated by using the stored mask densities in addition to the density characteristics thus stored. Information to be used in order to employ the stored mask densities in corresponding the picture printing condition may be obtained by checking the three color densities with the hue of the mask in an X-Y coordinate system having R-G and G-B axes, or by checking the mask hue and density in a three-dimensional coordinate system of having axes R, G and B.

In using the mask information of a deteriorated film to correct the printing conditions, the deviations of the three colors (R, G and B) mask densities from those of a normal negative film may be classified according to the average deviations of the deteriorated films, so that printing conditions are corrected according to the classification.

In the case of a 110 mm or 126 mm film, the mask density can be obtained by measuring a transparent region other than the image frames and the pre-exposed areas similarly as in the case of the transparent edge region of the 135 mm film, and therefore the same process can be applied thereto.

In FIG. 1, the mask density A indicates the average mask hue of "Fuji Color" film F-II which has been normally stored and developed; the mask density B indicates the mask hue of the same film, which has been developed after being kept at high temperature (80° C.); and the mask density C indicates the mask hue of the same film, which has been developed after being kept in the presence of high temperature (80° C.) high humidity (60%).

While the invention has been described primarily with respect to a negative which has deteriorated prior to being developed, it will be understood that the technical concept of the invention is similarly applicable to correcting the printing conditions where a developed negative color film has deteriorated because of poor storage conditions.

With the picture printing condition control method as described above, the exposure is corrected according to the determined characteristics of the deteriorated film, so that the resultant print may be improved in quality.

What is claimed is:

1. A method of controlling the printing conditions of a color negative, comprising:

measuring the densities of three separate colors, namely, red (R), green (G) and blue (B), of a mask obtained at a transparent portion of said color negative of a color negative film to be used for printing;

comparing said densities thus measured with the average densities of three separate colors, namely, red (R), green (G) and blue (B) of a mask obtained at a transparent portion of the color negative of a normal color negative film of a type equivalent to that of said color negative to be used for printing, to determine the degree of difference therebetween; and correcting the exposure condition according to said degree of difference thus determined.

2. A method as claimed in claim 1, said mask densities of said negative film to be printed are determined by mask density photometric means, and storing the smallest densities detected after a splice of said negative film passes said mask density photometric means as said mask densities.

3. A method as claimed in claim 1, further comprising measuring means storing density characteristics of image frames of said negative film to be printed, said exposure conditions being corrected according to said density characteritics.

4. A method as claimed in claim 1, said degree of difference between said film to be printed and said film to be printed and said normal film being classified according to the average deviations therefrom, said step of correcting said exposure conditions being carried out according to said classification.

* * * * *